United States Patent
Jakubowski, Jr. et al.

[11] Patent Number: 5,907,118
[45] Date of Patent: May 25, 1999

[54] STORES EJECTION SYSTEM

[75] Inventors: Thaddeus Jakubowski, Jr., St. Charles; John K. Foster, Florissant, both of Mo.

[73] Assignee: McDonnell Douglas Corporation, St. Louis, Mo.

[21] Appl. No.: 08/959,162

[22] Filed: Oct. 28, 1997

[51] Int. Cl.⁶ .................................................. B64D 1/04
[52] U.S. Cl. .............................................................. 89/1.51
[58] Field of Search ................................ 89/1.59, 1.54, 89/1.51; 244/137.4

[56] References Cited

U.S. PATENT DOCUMENTS

| | | | |
|---|---|---|---|
| 3,268,188 | 8/1966 | La Roe et al. | 244/118 |
| 3,367,233 | 2/1968 | Silverschotz | 89/1.5 |
| 3,598,341 | 8/1971 | La Roe et al. | 244/118 |
| 3,633,456 | 1/1972 | Carr et al. | 89/1 B |
| 3,677,506 | 7/1972 | La Roe | 244/137 |
| 3,787,012 | 1/1974 | Jakubowski, Jr. | 244/137 R |
| 3,887,150 | 6/1975 | Jakubowski, Jr. | 244/137 R |
| 3,942,749 | 3/1976 | Hasquenoph et al. | 244/137 R |
| 3,974,990 | 8/1976 | Holt et al. | 244/137 R |
| 4,043,525 | 8/1977 | Jakubowski, Jr. | 89/1.51 |
| 4,095,762 | 6/1978 | Holt | 244/137 R |
| 4,120,232 | 10/1978 | Hoffman, Jr. | 89/1.5 R |
| 4,204,456 | 5/1980 | Ward | 89/1.5 G |
| 4,257,639 | 3/1981 | Stock | 294/83 R |
| 4,343,447 | 8/1982 | Reed, III | 244/137 R |
| 4,347,777 | 9/1982 | Jakubowski, Jr. et al. | 89/1.51 |
| 4,388,853 | 6/1983 | Griffin et al. | 89/1.5 F |
| 4,395,003 | 7/1983 | Coutin | 244/137 R |
| 4,552,327 | 11/1985 | Carter | 244/137 R |
| 4,732,074 | 3/1988 | Normand | 89/1.51 |
| 4,746,083 | 5/1988 | Dupin et al. | 244/137.4 |
| 4,850,553 | 7/1989 | Takata et al. | 89/1.54 |
| 4,905,568 | 3/1990 | Hetzer et al. | 89/1.51 |
| 5,056,408 | 10/1991 | Joner et al. | 89/1.51 |
| 5,218,165 | 6/1993 | Cornelius et al. | 102/378 |
| 5,363,737 | 11/1994 | Wallis | 89/1.54 |
| 5,406,876 | 4/1995 | Harless et al. | 89/1.54 |
| 5,583,312 | 12/1996 | Jakubowski, Jr. | 89/1.54 |

FOREIGN PATENT DOCUMENTS 0 242 290   10/1987   European Pat. Off. .

*Primary Examiner*—Charles T. Jordan
*Assistant Examiner*—Theresa M. Wesson
*Attorney, Agent, or Firm*—Senniger, Powers, Leavitt & Roedel

[57] ABSTRACT

A stores ejection system for retaining a store on the underside of an aircraft and forcibly jettisoning the store away from the aircraft. The ejection system includes an ejector mechanism for releasably holding and jettisoning the store away from the aircraft and a storage device for storing pressurized gas at an operating pressure selected for actuating the ejector mechanism to release the store and forcibly jettison the store. The system further includes a dump valve movable between a closed position in which the storage device is isolated from the ejector mechanism, and an open position in which the pressurized gas is free to flow from the storage device to the ejector mechanism for pneumatic actuation of the ejector mechanism to release and jettison the store. The system includes a thermal control mechanism operable to heat the pressurized gas within the storage device upon operatively detecting a drop in pressure within the storage device to increase the pressure of the gas to the predetermined operating pressure.

20 Claims, 2 Drawing Sheets

STORES EJECTION SYSTEM

TECHNICAL FIELD

This invention relates generally to stores ejection systems, and more particularly, to pneumatic stores ejection systems for forcibly releasing stores from an aircraft.

BACKGROUND ART

Modern aircraft are designed to carry, release, and deliver on target a wide variety of weapons including bombs, missiles, rockets and other stores which are hung on the underside of the aircraft by an ejector rack. Typical racks are shown in U.S. Pat. Nos. 4,043,525 and 4,347,777, which are incorporated herein by reference. The aircraft typically include a release mechanism for releasing the store and an ejector ram for forcibly ejecting the store away from the aircraft.

One type of ejection system uses pyrotechnic cartridges which generate high pressure gas for actuating the release mechanism and actuating the ejector ram to forcibly eject the store away from the aircraft. While pyrotechnic cartridges provide a low weight system, these systems also have certain undesirable characteristics including high maintenance costs. When the cartridges are fired the chemical burning of the explosive charge results in a large amount of residue, containing moisture and corrosives, being deposited within the system. If the ejection system is not properly disassembled and cleaned after a certain number of firings, the system will quickly become corroded and unreliable. Furthermore, storage and handling of the pyrotechnic cartridges poses a possible safety risk for maintenance personnel.

Another type of ejection system is a cold gas ejection system disclosed in U.S. Pat. No. 5,583,312, which is incorporated herein by reference. The release mechanism and ejector ram are actuated pneumatically by air received from an on-board compressor system. The compressor system provides an initial charge for an ejection system accumulator and means for recharging the accumulator in flight to account for pressure drop due to temperature changes.

While the cold gas ejection system provides operational benefits by eliminating the build-up of residue and corrosive materials produced by pyrotechnic cartridges, certain aircraft may not have the additional volume required for the on-board compressor. In addition, the compressor system adds weight to the aircraft.

DISCLOSURE OF INVENTION

The stores ejection system of the present invention overcomes the (deficiencies of the prior art by providing an ejection system which eliminates the need for an on-board compressor, provides consistent pressure levels for quick and accurate deployment of the stores and reduces maintenance time. The elimination of an on-board compressor system reduces the weight of the aircraft, decreases volume requirements, lowers the cost of the aircraft and reduces maintenance time and costs. Among the features of the present invention may be noted the provision of a stores ejection system which provides thermal control of the gas supplied to an ejector mechanism to optimize system performance. The system does not require hydraulic pressure, thus eliminating leakage problems typically inherent with hydraulic systems. The system utilizes clean gas which eliminates the burdensome cleaning requirements associated with pyrotechnic systems. The present invention overcomes the limitations of the prior art systems by providing a light-weight, low volume, low maintenance, reliable stores ejection system.

Generally, a stores ejection system of the present invention is for retaining a store on the underside of an aircraft and forcibly jettisoning the store away from the aircraft. The ejection system comprises an ejector mechanism for releasably holding and jettisoning the store away from the aircraft and a storage device for storing pressurized gas at an operating pressure selected for actuating the ejector mechanism to release the store and forcibly jettison the store. The system further comprises a dump valve movable between a closed position in which the storage device is isolated from the ejector mechanism, and an open position in which the pressurized gas is free to flow from the storage device to the ejector mechanism for pneumatic actuation of the ejector mechanism to release and jettison the store. The system includes a thermal control mechanism operable to heat the pressurized gas within the storage device upon operatively detecting a drop in pressure within the storage device to increase the pressure of the gas to the operating pressure.

In another aspect of the present invention, a stores ejection system generally comprises an ejector mechanism for releasably holding and jettisoning the store away from the aircraft, and a storage device for storing pressurized gas at an operating pressure selected for actuating the ejector mechanism to release the store and forcibly jettison the store. The storage device is free of connection to any pressure source on board the aircraft. The ejection system further comprises a dump valve movable between a closed position in which the storage device is isolated from the ejector mechanism, and an open position in which the pressurized gas is free to flow from the storage device to the ejector mechanism for pneumatic actuation of the ejector mechanism to release and jettison the store. The system also includes a fill valve for initial charging of the storage device. The fill valve is constructed and arranged to permit filling of the storage device only while the aircraft is in a landed condition.

A method of the present invention is for holding a store and jettisoning the store from an aircraft. The aircraft includes a stores ejection system comprising an ejector mechanism and a storage device. The method generally comprises the steps of connecting the storage device with a pressure source located external to the aircraft and filling the storage device prior to take-off with a gas until the pressure of the gas within the storage device reaches an operating pressure selected for actuating the ejector mechanism to release the store and forcibly jettison the store away from the aircraft. The method further comprises heating the gas in the storage device in flight following a pressure drop within the storage device to increase the pressure of the gas to the operating pressure.

Other objects and features will be in part apparent and in part pointed out hereinafter.

BRIEF DESCRIPTION OF THE DRAWINGS

Corresponding reference characters indicate corresponding parts throughout the several views of the drawings.

BEST MODE FOR CARRYING OUT THE INVENTION

Figure 1:
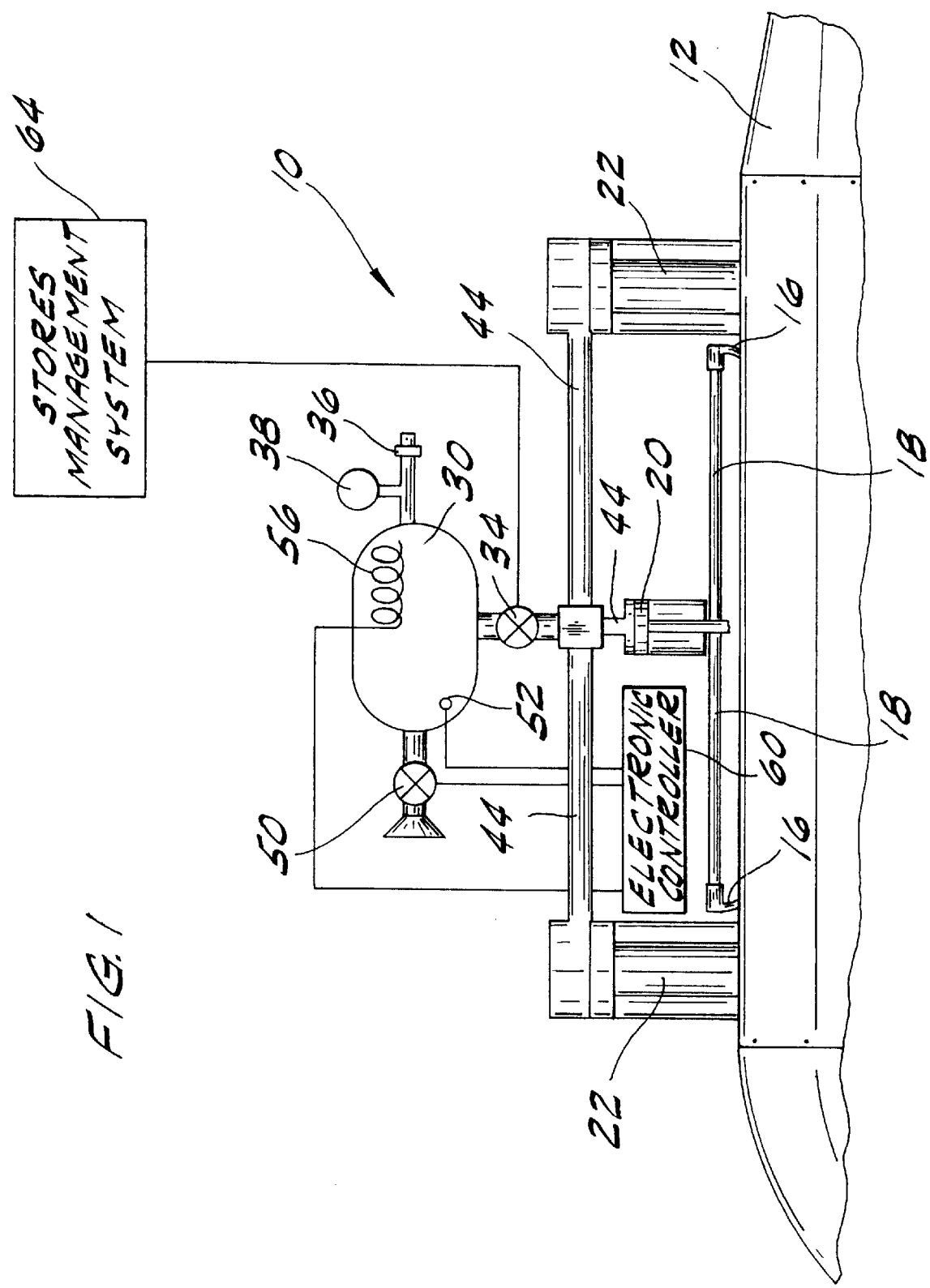
FIG. 1 is a schematic view of a stores ejection system of the present invention.

Referring now to the drawings, and first to FIG. 1, a stores ejection system of the present invention is schematically shown and generally indicated at 10. The ejection system is used for retaining a store 12 such as a bomb, missile, rocket or any other weapon on an aircraft and jettisoning the store away from the aircraft. It is to be understood that the stores ejection system 10 may also be used on helicopters, spacecraft or other vehicles. The ejection system 10 may be used for external pylon weapon carriage of stores 12, internal weapon carriage of stores, and external weapon carriage of stores from multiple ejector racks, as is well known by those skilled in the art.

Figure 2:
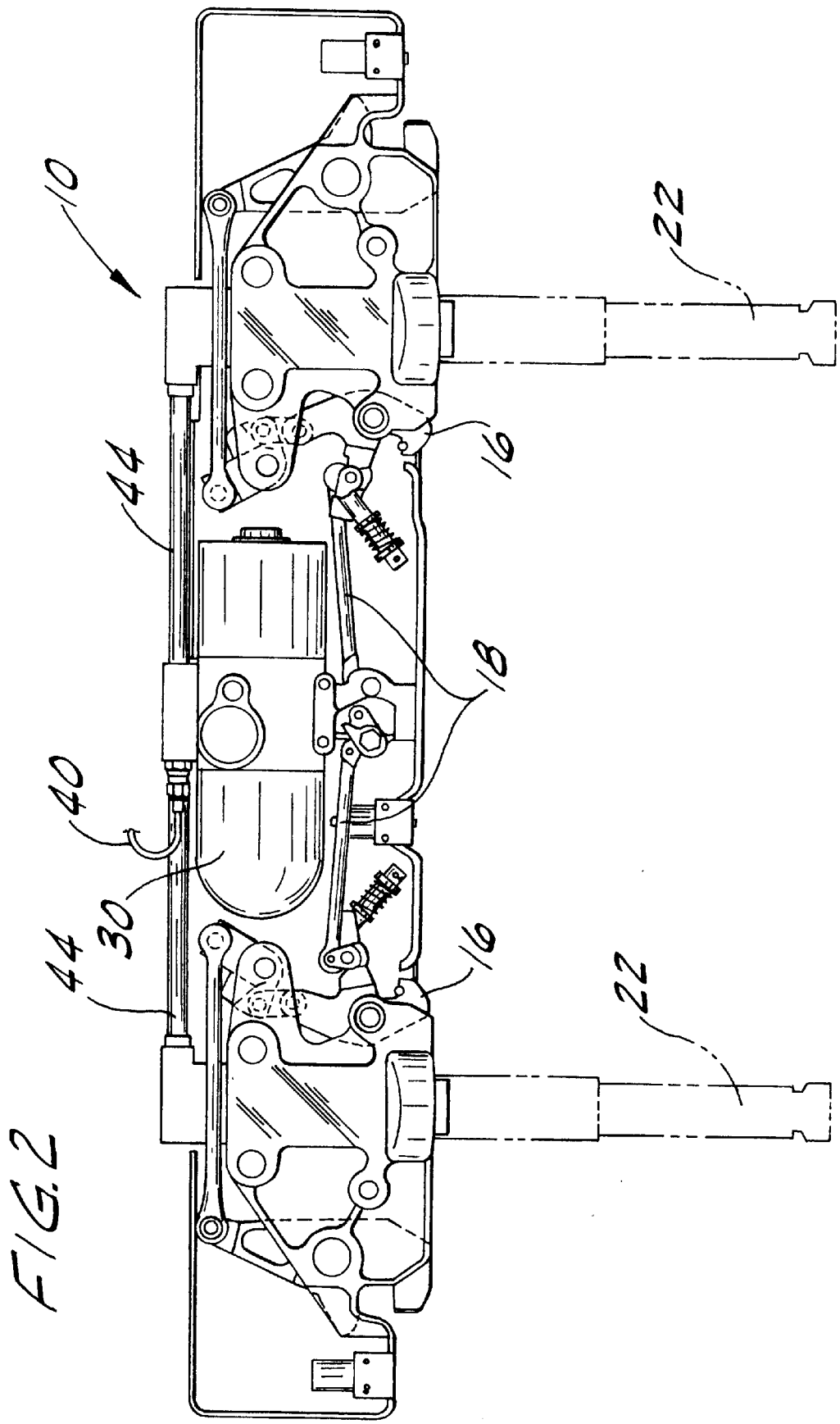
FIG. 2 is a side view of a portion of the ejection system of FIG. 1.

The stores ejection system 10 includes an ejector mechanism for releasably holding and jettisoning the store away from the aircraft (FIGS. 1 and 2). The ejector mechanism comprises two hooks 16 pivotable between a closed position for retaining the store 12 on the aircraft, and an open position for installation of the store on the aircraft and release of the store from the aircraft. The hooks 16 are connected to linkages 18 which are driven by a hook piston 20, as is well known by those skilled in the art. The ejector mechanism further includes two ejector pistons 22 for forcibly ejecting the store 12 away from the aircraft as further described below. The number and arrangement of hooks 16 and ejector pistons 22 may be different than shown without departing from the scope of the invention. The hook piston 20 and ejector pistons 22 are pneumatically actuated by gas supplied to the ejector mechanism by a storage device 30.

The storage device 30 holds pressurized gas at an operating pressure selected for actuating the ejector mechanism to release the store 12 and forcibly jettison the store. The operating pressure may be approximately 6000 psi, for example. The storage device 30 may be a hollow container, a container having baffles, or an accumulator, for example. The gas is preferably clean air but may be another gas such as nitrogen.

The stores ejection system 10 further comprises a dump valve 34 movable between a closed position in which the storage device 30 is isolated from the ejector mechanism, and an open position in which the pressurized gas is free to flow from the storage device to the ejector mechanism for pneumatic actuation of the hook piston 20 and ejector pistons 22 to release and jettison the store. The dump valve 34 may be a solenoid operated pneumatic valve, for example.

A fill valve 36 is located on the aircraft for connection with a pressure source (not shown) located external to the aircraft. The pressure source may be a ground cart or air bottle or any other suitable ground support equipment which is not adapted for flight with the aircraft. A pressure gauge 38 is preferably located near the fill valve 36 to provide visual indication of the pressure within the storage device 30 during filling of the storage device from the external pressure source through the fill valve. The fill valve 36 is used for initial charging of the storage device 30 while the aircraft is in a landed condition prior to flight. It is to be understood that the landed condition includes an aircraft on a carrier or an aircraft raised off the ground on jacks, for example. If more than one storage device 30 is used on the aircraft, each storage device may have its own fill valve 36 or a manifold may be used to provide fluid communication between one fill valve and multiple storage devices. The fill valve 36 is preferably located such that it is easily accessible by ground crew personnel and may be located in the landing gear bay, for example. The fill valve 36 is preferably spring biased to a closed position to prevent inadvertent loss of pressure due to failure to properly close the valve after filling the storage device 30.

The fill valve 36 is in fluid communication with a fill line 40. The fill line 40 feeds pressurized gas into the storage device 30. Passages 44 provide fluid communication between the storage device 30 and the hook and ejector pistons 20, 22 which are reciprocally driven when the dump valve 34 is opened. The arrangement of the dump valve 34, passages 44, ejector pistons 22 and hook piston 20 is such that the ejector pistons are actuated to jettison the store 12 away from the aircraft immediately after actuation of the hook piston.

A vent valve 50 is provided to vent gas from the storage device 30 in case of overpressurization of the storage device. The vent valve 50 may be electronically operated and energized upon the pressure sensor 52 sensing an overpressurization condition in the storage device or may be a pneumatically operated relief valve, for example.

It is to be understood that the arrangement of the storage device 30, dump valve 34, vent valve 50, and ejector mechanism may be other than shown and described herein without departing from the scope of the invention.

In order to maintain the pressure of the gas within the storage device 30 at the correct operating pressure, a thermal control mechanism is provided to heat the pressurized gas within the storage device upon sensing a drop in pressure within the storage device to increase the pressure of the gas to the operating pressure. The thermal control mechanism preferably comprises a pressure sensor 52 capable of detecting a variance in the pressure of the gas in the storage device from the operating pressure. A temperature sensor may be provided instead of or in addition to the pressure sensor 52 to detect a drop in temperature of the gas in the storage device 30 indicative of a drop in pressure below the operating pressure.

The thermal control mechanism further includes a heater 56 operable upon detection of a drop in pressure within the storage device 30 below the operating pressure to heat the gas in the storage device, thereby increasing the pressure of the gas within the storage device to the correct operating pressure. If either the temperature or pressure sensor 52 senses a decrease in pressure or temperature below a predetermined level, the gas is heated until the pressure rises to the operating pressure.

The heater 56 (shown schematically in FIG. 1) may be a resistance heater in the form of a coil inserted into the storage device 30 or may be a thermal blanket wrapped around the storage device, for example. The storage device 30 may also be wrapped in insulation to reduce the loss of heat from the storage device. The stores ejection system 10 preferably includes a safety device operable to disable the heater 56 if the pressure within the storage device drops to approximately atmospheric pressure due to a catastrophic leak in the storage device 30 or associated plumbing to prevent overheating of the storage device. It is to be understood that heating devices other than those disclosed or shown herein may also be used.

An electronic controller 60 is used to monitor the temperature or pressure sensor 52, energize and de-energize the heater 56, open the vent valve 50, and turn on the safety device. A stores management system 64 is used to control the opening of the dump valve 34, in a manner well known by those skilled in the art. The stores management system 64 sends a signal to open the dump valve 34 upon receiving a store release command. The electronic controller 60 and stores management system 64 may also be combined into one electronic unit.

In operation, the store 12 is initially loaded with the storage device 30 in an unpressurized state. A pressure source such as a ground cart is connected to the storage device 30 to pressurize the storage device prior to take-off of the aircraft. The storage device 30 is filled with air until the pressure within the storage device reaches an operating pressure selected for actuation of the ejector mechanism to release and forcibly jettison the store away from the aircraft. The ground cart is then disconnected from the fill valve 36 and the aircraft is ready for flight. During flight, if the pressure within the storage device 30 drops it is sensed by either a temperature or pressure sensor 52 which in turn sends a signal to the heater 56. The heater 56 heats the gas until the pressure within the storage device 30 reaches its operating pressure.

Upon receiving a store release command, the stores management system 64 sends a signal to open the dump valve 34 which allows pressurized air from the storage device 30 to flow into the hook piston 20 to drive the hooks 16 downward to release the store 12 while also flowing through passages to pressurize and drive each of the ejector pistons 22 to their extended positions, thus fully releasing and jettisoning the store away from the aircraft. The actuating mechanisms for the hook and ejector pistons 20, 22 are pneumatically synchronized so that the hooks 16 release the store 12 before the ejector pistons 22 force the store downwardly, away from the aircraft. At the end of the ejector piston stroke, the electronic controller 60 may open the vent valve 50 to fully discharge the storage device 30.

It will be observed from the foregoing that the stores ejection system 10 of this invention has numerous advantages. Importantly, the system 10 uses clean gas, thus eliminating maintenance required with conventional pyrotechnic systems. The pneumatic system allows for the fabrication of components from light-weight materials such as aluminum, titanium, and composites, which typically cannot be used within a pyrotechnic system due to the high temperature erosive characteristics of pyrotechnics. Periodic tear down, repair, and replacement, caused by pyrotechnic erosion is substantially eliminated, thus significantly increasing service life and reliability while simultaneously reducing maintenance costs. Moreover, the use of pneumatics in lieu of hydraulics further simplifies the system and increases system reliability. The ejection system 10 of the present invention eliminates the need for an on-board compressor, thus reducing the overall weight of the aircraft and volume requirements for the system as well as reducing the cost of the aircraft, and maintenance requirements associated with an on board compressor system.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A stores ejection system for retaining a store on the underside of an aircraft and forcibly jettisoning the store away from the aircraft, the ejection system comprising:

an ejector mechanism for releasably holding and jettisoning the store away from the aircraft;

a storage device for storing pressurized gas at an operating pressure selected for actuating the ejector mechanism to release the store and forcibly jettison the store;

a dump valve movable between a closed position in which the storage device is isolated from the ejector mechanism, and an open position in which the pressurized gas is free to flow from the storage device to the ejector mechanism for pneumatic actuation of the ejector mechanism to release and jettison the store; and a thermal control mechanism operable to heat the pressurized gas within the storage device upon operatively detecting a drop in pressure within the storage device to increase the pressure of the gas to the operating pressure.

2. A stores ejection system as set forth in claim 1 wherein the thermal control mechanism comprises a sensor capable of operatively detecting a variance in pressure of the gas in the storage device from the operating pressure and a heater operable upon detection of a drop in pressure in the storage device below the operating pressure to heat the gas in the storage device.

3. A stores ejection system as set forth in claim 2 wherein the sensor is operable to detect the temperature of the pressurized gas in the storage device, the heater being energized upon detection of a drop in temperature indicative of a pressure drop in the storage device below the operating pressure.

4. A stores ejection system as set forth in claim 1 wherein the thermal control mechanism comprises a resistance heater inserted within the storage device.

5. A stores ejection system as set forth in claim 1 wherein the thermal control mechanism comprises a heating blanket wrapped around the storage device.

6. A stores ejection system as set forth in claim 1 further comprising a fill valve configured for connection with a pressure source located external to the aircraft and not adapted for flight with the aircraft for filling the storage device.

7. A stores ejection system as set forth in claim 6 further comprising a pressure gauge to provide visual indication of the pressure within the storage device during filling of the storage device from the external pressure source through the fill valve.

8. A stores ejection system as set forth in claim 1 further comprising a safety device to disable the thermal control mechanism if the pressure within the storage device drops to approximately atmospheric pressure to prevent overheating of the storage device.

9. A stores ejection system as set forth in claim 1 further comprising a vent valve for preventing over pressurization of the storage device.

10. A stores ejection system as set forth in claim 1 further comprising a plurality of ejector mechanisms, the system further including a manifold in communication with the storage device and each release mechanism.

11. A stores ejection system as set forth in claim 1 wherein the ejector mechanism comprises at least one hook pivotable between a closed position for retaining the store on the aircraft, and an open position for installation of the store on the aircraft and release of the store from the aircraft.

12. A stores ejection system as set forth in claim 11 wherein the ejector mechanism comprises an ejector piston for ejecting the store away from the aircraft.

13. A stores ejection system for retaining a store on the underside of an aircraft and forcibly jettisoning the store away from the aircraft, the ejection system comprising:

an ejector mechanism for releasably holding and jettisoning the store away from the aircraft;

a storage device for storing pressurized gas at an operating pressure selected for actuating the ejector mechanism to release the store and forcibly jettison the store, the storage device being free of connection to any pressure source on board the aircraft;

a dump valve movable between a closed position in which the storage device is isolated from the ejector mechanism, and an open position in which the pressurized gas is free to flow from the storage device to the ejector mechanism for pneumatic actuation of the ejector mechanism to release and jettison the store; and a fill valve for initial charging of the storage device, the fill valve being constructed and arranged to permit filling of the storage device only while the aircraft is in a landed condition.

14. A stores ejection system as set forth in claim 13 wherein the fill valve is configured for connection with a pressure source located external to the aircraft and not adapted for flight with the aircraft.

15. A stores ejection system as set forth in claim 13 wherein the ejector mechanism comprises at least one hook pivotable between a closed position for retaining the store on the aircraft, and an open position for installation of the store on the aircraft and release of the store from the aircraft.

16. A stores ejection system as set forth in claim 13 wherein the ejector mechanism comprises an ejector piston for ejecting the store away from the aircraft.

17. A stores ejection system as set forth in claim 13 further comprising a thermal control mechanism operable to heat the pressurized gas within the storage device upon operatively detecting a drop in pressure within the storage device to increase the pressure of the gas to the operating pressure.

18. A method of holding and jettisoning a store from an aircraft, the aircraft having a stores ejection system comprising an ejector mechanism and a storage device, the method comprising the steps of:

connecting the storage device with a pressure source located external to the aircraft and filling the storage device prior to take-off with a gas until the pressure within the storage device reaches an operating pressure selected for actuating the ejector mechanism to release the store and forcibly jettison the store away from the aircraft; and heating the gas in the storage device in flight following a pressure drop within the storage device to increase the pressure of the gas to the operating pressure.

19. A method of holding and jettisoning a store as set forth in claim 18 further comprising operatively detecting the pressure in the storage device and sending a signal to a heater to heat the gas in the storage device when the pressure drops below a predetermined limit.

20. A method of holding and jettisoning a store as set forth in claim 18 further comprising sensing the temperature of the gas in the storage device and sending a signal to a heater to heat the gas in the storage device when the temperature drops below a predetermined limit.

* * * * *